April 4, 1961 W. R. SCHLATTER 2,978,620
REMOTE CONTROL SERVOSYSTEM
Filed April 11, 1957 3 Sheets-Sheet 1

INVENTOR.
Wilhelm Rudolf Schlatter
BY Michael S. Striker
agt.

INVENTOR.
Wilhelm Rudolf Schlatter
BY Michael S. Striker
agt.

FIG.5

United States Patent Office 2,978,620
Patented Apr. 4, 1961

2,978,620

REMOTE CONTROL SERVOSYSTEM

Wilhelm Rudolf Schlatter, Zurich, Switzerland, assignor to Contraves A.G., Zurich, Switzerland Filed Apr. 11, 1957, Ser. No. 652,269

Claims priority, application Switzerland Apr. 12, 1956

20 Claims. (Cl. 318—28)

The present invention relates to a remote control apparatus. More particularly, the present invention relates to a telemetering apparatus for controlling a remotely located rotatable shaft by means of rotating a rotatable shaft at a control station.

There are many servomechanisms in use today wherein a receiver shaft is rotated and caused to follow a rotatable transmitter shaft. In such an arrangement there is usually a transmitter having a plurality of windings wherein the change of angular position of the transmitter shaft changes the phase relationship of the voltage produced in the windings of the transmitter. This voltage is transmitted to a receiver and the new phase relationship of the voltage applied to the receiver causes the receiver shaft to be rotated an amount corresponding to the rotation of the transmitter shaft. In this manner the receiver shaft can be made to be automatically rotated synchronously with the transmitter shaft.

In the conventional apparatus, the voltage is transmitted by means of cables.

A disadvantage of these conventional systems is that the alternating carrier voltage used between the transmitter and receiver is subject to amplitude variations. These amplitude variations are produced in the cables between the transmitter and receiver and even exist in wireless transmitter-receiver arrangements. For this reason it is not possible to use the servomechanism or synchro-transmission systems when the receiver shaft is located a large distance from the transmitter shaft.

One of the characteristics of the voltage that remains substantially constant is the frequency regardless of the distance between the receiver and the transmitter. Some transmitter-receiver systems based on frequency have been developed. These systems generally use synchronous motors for control purposes. When the transmitter shaft is varied, the frequency of the transmitted voltage is changed and the rotational speeds of the synchronous motors are changed to bring about a corresponding change in the receiver shaft. Unfortunately, in such systems, it is necessary for the synchronous motors to operate throughout a wide frequency range in order to permit accurate control. With conventional synchronous motors it is not possible to produce accurate operation over the necessary wide frequency ranges.

With the present invention no synchronous motors are used and the frequency of the transmitted voltage is used to control the movement of the remotely located receiver shaft.

It is accordingly an object of the present invention to overcome the disadvantages of the known remote control systems, above described.

A second object of the present invention is to provide a new and improved remote control apparatus.

Another object of the present invention is to provide a new and improved remote control apparatus utilizing the frequency of the voltage transmitted between the transmitter and receiver for controlling the movement of the receiver shaft.

A further object of the present invention is to provide frequency generators, the frequency of which can be changed by the movement of the transmitter shaft.

Yet another object of the present invention is to provide a remote control apparatus utilizing a Wien bridge circuit arrangement for providing accurate frequencies for control purposes.

Yet a further object of the present invention is to provide a remote control apparatus wherein the receiver shaft can synchronously and accurately follow rotation of the transmitter shaft beyond a 360° rotation.

With the above objects in view, the present invention mainly consists of a remote control apparatus including a first movable member, frequency generating means actuated by the first movable member for generating electrical signals the frequency of which is dependent upon and characteristic of the position of the first movable member, frequency responsive means influenced by frequency variations of the electrical signals generated by the frequency generating means and producing electrical output signals having characteristics corresponding to variations of the frequency of the electrical signals generated by the frequency generating means, a second movable member spaced from the first movable member, and actuating means responsive to the electrical output signals of the frequency responsive means for moving the second movable member depending upon the characteristics of the electrical output signals, whereby any change in the position of the first movable member produces a corresponding variation in the frequency of the electrical signals generated by the frequency generating means which in turn causes corresponding changes in the characteristics of the electrical output signals produced by the frequency responsive means to change the position of the second movable member an amount determined by the change of the first movable member.

In a preferred embodiment of the present invention the frequency generating means includes a Wien bridge circuit frequency determining portion having a variable impedance means. The first movable member is connected to the variable impedance means so that the output frequency of the frequency generator corresponds to the position of the first movable member. The frequency responsive means includes a Wien bridge circuit arrangement which is tuned to a particular frequency determined by and characteristic of the position of the second movable member. The signal produced by the first movable member and the frequency generating means is applied to the frequency responsive means to produce a control voltage which actuates the second movable member to change the tuned frequency of the frequency responsive means until it corresponds to the frequency generated by the frequency generator means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2:
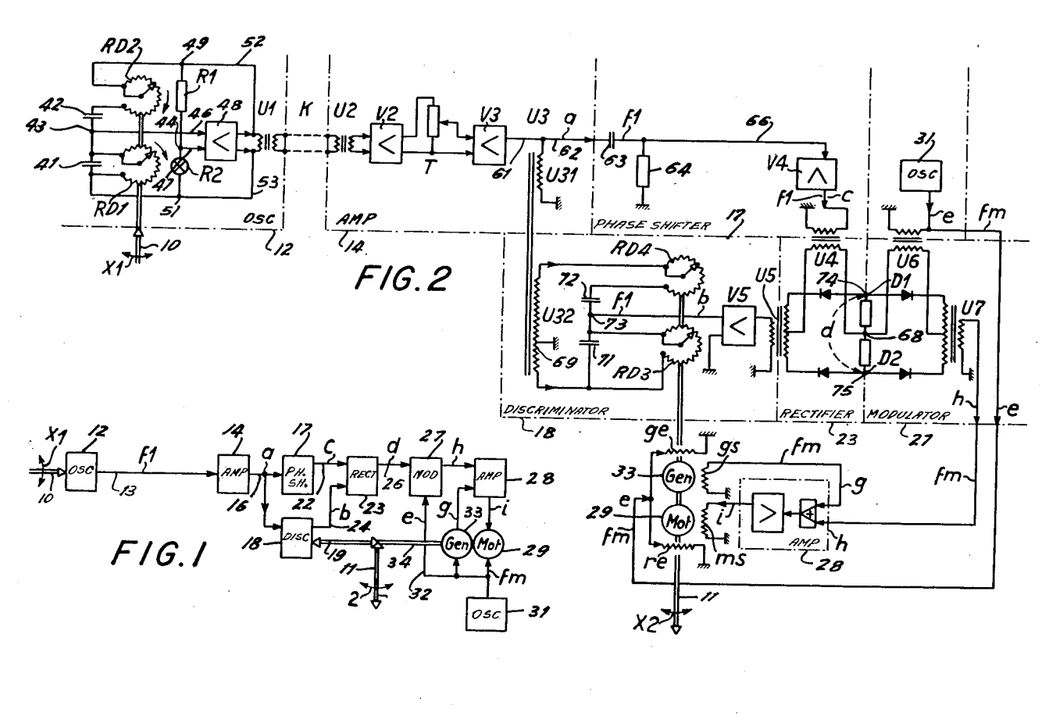
Fig. 1 is a block diagram of the remote control apparatus incorporating the principles of the present invention.
Fig. 2 is an electrical schematic diagram of the apparatus illustrated in Fig. 1.

Referring to the drawings and more particularly to Fig. 1, it can be seen that in the remote control apparatus, the transmitter shaft to be rotated is identified by the numeral 10 and the receiver shaft to be rotated synchronously with the transmitter shaft 10 is identified by the numeral 11.

The transmitter shaft 10 is connected to an oscillator 12 and varies the frequency of the same to produce on the output connection 13 an electrical signal having the frequency $f1$. This electrical signal is applied to an amplifier 14 which amplifies the electrical signal and produces an output sine wave voltage $a$ on the output connection 16 thereof.

The sine wave is applied to the input of a phase shifter 17 and simultaneously to a discriminator 18. The discriminator 18 is mechanically connected to the receiver shaft 11 by means of a shaft 19 coupled to the receiver shaft 11 with a bevel gear arrangement 21 which is only diagrammatically illustrated.

The output of the phase shifter 17 is connected by a conductor 22 to a rectifier 23. It can be seen that the output of the discriminator 18 is also connected by means of a conductor 24 to the input of the rectifier 23. The various letters in the block diagram of Fig. 1 correspond to wave shapes to be described subsequently with respect to Figs. 4a–4c.

The output of the rectifier 23 is connected by means of a conductor 26 to the input of a modulator 27 the output of which in turn is connected to an amplifier 28.

The amplified output from the amplifier 28 is applied to a motor 29 which also has applied to it the output of an oscillator 31. It can be seen that the output of the oscillator 31 is also applied to the modulator 27 by means of a conductor 32 and to a generator 33. The motor 29 and the generator 33 have rotors which are respectively mounted on a shaft 34 which is mechanically connected to the receiver shaft 11.

In operation, the change in the angular position of the shaft 10 corresponding to an angle of $x1$ changes the frequency of the output signal of the oscillator 12 by an amount corresponding to the angle $x1$. This output signal from the oscillator 12 is applied on the conductor 13 to the amplifier 14 wherein it is amplified and its output level regulated to a preselected amount.

From the amplifier 14 the amplified signal is applied to the phase shifter 17 wherein it is shifted 90° and to the discriminator 18. The discriminator 18 is already tuned to a frequency $f2$ which has been determined by the previous setting of the receiver shaft 11. When the signal occurring at the new frequency $f1$ is applied to discriminator 18, the discriminator produces an output signal on its output conductor 24 which is a function of the difference in frequency $f1-f2$. This output signal from the discriminator 18 is applied to the rectifier 23 together with the phase shifted signal from the phase shifter 17. The rectifier 23 produces a rectified signal having an amplitude proportional to the frequency difference $f1-f2$ and a polarity corresponding to the sign of the signal $f1-f2$. That is if $f1$ is larger than $f2$, the rectified signal will have one polarity and if the frequency $f2$ is larger than $f1$, the rectified signal of the rectifier 23 will have a polarity which is shifted 180°.

This rectified signal is applied to the modulator 27 wherein it is modulated by the output frequency from the oscillator 31, which output frequency signal is also applied to the modulator on the conductor 32. The modulated output signal from the modulator 27 is applied to the amplifier 28 in the form of a control signal which is proportional to the amount of change between $f1$ and $f2$. The amplified signal output from the amplifier 28 is applied to the winding of the motor 29 which already has a signal from the oscillator 31 applied to a second winding thereof. The difference in voltages applied to the windings of the motor 29 causes the same to rotate in a direction and an amount proportional to the frequency change. The rotation of the shaft 34 simultaneously rotates the receiver shaft 11 and the shaft 19 which is connected to the discriminator 18.

The rotation of the shaft 19 changes the frequency to which the discriminator 18 is tuned so as to bring the tuned frequency $f2$ thereof closer to the frequency $f1$ applied thereto. The new output signal from the discriminator 18 is again applied to the rectifier, modulator, etc., to the motor 29 which continues to adjust the shaft 34 and the receiver 11 until the discriminator is now tuned to the new frequency $f1$ at which point the output signal of the discriminator 18 becomes zero.

Accordingly, at this point, no further signal will be applied to the motor 29 so that the receiver shaft 11 will remain stationary. At this point, the receiver shaft 11 will have been rotated an amount corresponding exactly to the amount of which the transmitter shaft 10 was originally rotated. For stabilizing purposes, a generator 33 is also mounted on the shaft 34, which generator produces a stabilizing voltage due to the rotation of the shaft 34. This stabilizing voltage is applied to the amplifier 28 and added in the proper direction to the voltage from the modulator 27.

Accordingly, it can be seen that with the arrangement indicated in the block diagram of Fig. 1, a change in the angular position of the transmitter shaft 10 will produce a corresponding change in the angular position of the receiver shaft 11. It is apparent that the shafts 10 and 11 need only be movable members since rectilinear movement can also be utilized for changing the frequencies to achieve a corresponding rectilinear movement of the receiver movable member.

Referring now to Fig. 2, an explanation of the construction of the various elements of the block diagram of Fig. 1 will be provided. In Fig. 2, it can be seen that the transmitter shaft 10 is connected to the movable taps of two variable resistors RD1 and RD2. The variable resistor RD1 is connected in parallel with a capacitor 41 and the variable resistor RD2 is connected in series with a capacitor 42. These resistors and capacitors form the frequency determining portion of a Wien bridge circuit arrangement utilized in the oscillator 12.

The remaining resistive elements of the Wien bridge circuit arrangement are the resistors R1 and R2. The resistor R2 is a resistor, the resistance of which changes with temperature. The resistor R2 can be an electric light bulb, for example. The output terminals 43 and 44 of the Wien bridge circuit are connected by conductors 46 and 47 to an amplifier 48 and the amplified output from the amplifier 48 is applied to the primary winding of a transformer U1. A portion of this amplified output voltage from the amplifier 48 is also fed back to the input terminals 49 and 51 of the Wien bridge circuit arrangement by means of conductors 52 and 53 respectively.

In accordance with conventional Wien bridge oscillator arrangements, this voltage fed back from the output of the amplifier 48 provides positive feedback which is developed across the frequency selective resistance-capacitance network of the bridge. The resistor 47 provides a negative feedback voltage by virtue of its temperature-resistance characteristic so as to regulate the amplitude of the oscillations. This produces a highly stable sine-wave oscillator, thereby providing a sine wave output occurring at a frequency $f1$ determined by the angular position of the rotatable transmitter shaft 10.

The output signal from the oscillator 12 is taken from the secondary of the transformer U1 and applied by means of a cable K to the remotely located receiver station having the receiver shaft 11 therein.

The electrical signal occurring at the frequency $f1$ is applied to the primary winding of the transformer U2 and from the secondary thereof to an amplifier V2.

The output from the amplifier V2 is applied to a potentiometer T where the output level of the amplifier V2 may be adjusted and from potentiometer to the amplifier V3. The output of the amplifier V3 is applied on the conductor 61 to the primary winding U31 of the transformer U3. This output voltage is also applied on a conductor 62 to the input of the phase shifter 17. In the phase shifter 17, the electrical signal is shifted by means of the capacitor 63 and resistor 64 by 90° and applied on conductors 66 to the input of the amplifier V4. The output of the amplifier V4, occurring at the frequency $f_1$, is applied to the primary winding of the transformer U4. The voltage induced in the secondary winding of the transformer U4 is applied to the terminals 67 and 68 of the rectifier 23 for a purpose which will be described hereinbelow.

The output voltage from the amplifier V3 applied to the primary of the transformer U3 induces a voltage in the secondary winding U32 of the transformer U3. The secondary winding U32 is provided with a grounded tap 69 at a portion of the secondary winding so that the voltage developed across the winding is in the ratio of two to one. This secondary winding U32 serves as the purely resistive branch of a second Wien bridge circuit arrangement forming part of the discriminator 18. The remaining elements of the Wien bridge circuit arrangement forming the frequency determining portion thereof are the resistors RD3 and RD4 and the capacitors 71, connected in parallel with variable resistor RD3 and capacitor 72 connected in series with the variable resistor RD4.

The variable resistors RD3 and RD4 respectively have movable taps which are mechanically connected to the receiver shaft 11 so that the frequency to which the Wien bridge circuit arrangement is tuned is determined by the angular position $x_2$ of the receiver shaft 11.

The Wien bridge circuit arrangement of the discriminator 18 to which the signal occurring at a frequency $f_1$ is applied produces on the output conductor 73 thereof an output signal which is a function of the frequency difference $f_2-f_1$. This output signal is illustrated in the vector diagram of Fig. 3.

Figure 3:
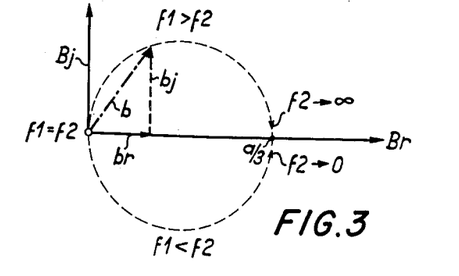
Fig. 3 is a vector diagram of a voltage produced in the circuit of Fig. 2.

Referring to Fig. 3, it can be seen that the vector representing the output voltage developed on the output conductor 73 is identified by the letter $b$. In Fig. 3 the real component $br$ and the imaginary component $bj$ of the vector $b$ are illustrated. It is clear that the $x$ axis of the diagram of Fig. 3 is the real axis $Br$ and the $y$ axis is the imaginary axis $Bj$. The dotted circle represents the end of the vector $b$ for various frequency differences $f_1-f_2$. This circle intersects the real axis $Br$ at the values 0 and $a/3$. It is clear that the null point corresponds to the frequency difference 0 and the $a/3$ point corresponds to the situation wherein $f_1$ equals either 0 or infinity.

It is also apparent that in that port of the circle above the $Br$ axis, the difference $f_1-f_2$ is positive and in the part below the $Br$ axis, the difference $f_1-f_2$ is negative.

Referring again to Fig. 2, the output voltage from the discriminator 18 occurring at the conductor 73 is applied to the amplifier V5 and the amplified output of this amplifier is applied to the primary winding of the transformer U5. The secondary winding of the transformer U5 forms part of the rectifier 23 to which has already been applied the phase shifted signal from the secondary winding of the transformer U4.

The rectifier 23 operates to produce across the output terminals 74 and 75 thereof a rectified signal having an amplitude proportional to the frequency difference $f_1-f_2$ and a polarity which depends on which of the frequencies $f_1$ or $f_2$ is the larger. This is achieved in a manner which will be explained with respect to Figs. 4a–4c.

Figures 4A, 4B:
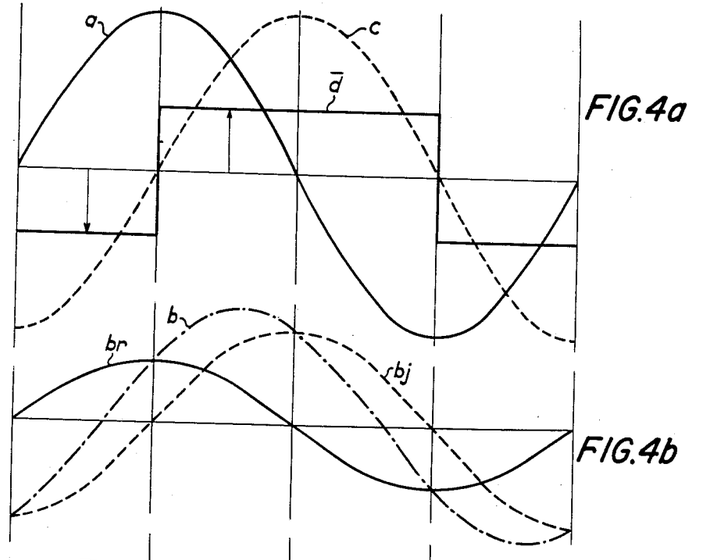
Figs. 4a–4c are graphical representations of the wave shapes of voltages produced at different portions of the circuit of Fig. 2.

In Fig. 4a, the signal applied to the discriminator 18 and to the phase shifter 17 is indicated in solid lines and identified by the letter $a$. After the signal $a$ which is in the form of a sine wave passes through the phase shifter 17, it is shifted 90° and is indicated by the dotted line $c$ of Fig. 4a. This sine wave $c$ is applied to the terminals 67 and 68 of the rectifier 23. The square wave $\overline{d}$ indicates the direction in which the rectifier 23 is actually open. This is controlled by the sine wave $c$ which is applied to the terminals 67 and 68 of the rectifier 23.

Referring now to Fig. 4b, the since wave $b$ corresponding to the output voltage from the discriminator 18 is illustrated. Also illustrated are the real component $br$ and the imaginary component $bj$. It can be seen that the imaginary component $bj$ of the sine wave $b$ leads the real component $br$ by 90°.

Figure 4C:
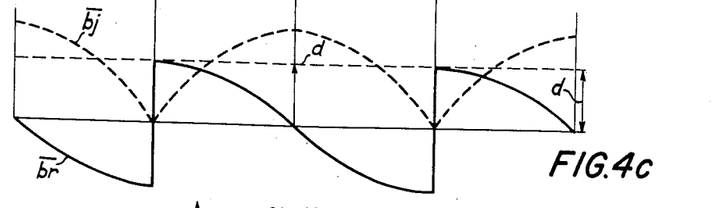

In Fig. 4c, the rectified components $\overline{br}$ and $\overline{bj}$ resulting from rectification in the rectifier 23, are shown. It has been found that only the imaginary components $\overline{bj}$ of the discriminator signal contributes to the direct voltage $d$. Accordingly, the direction of the direct voltage $d$, shown in Fig. 4c depends on the sign of the difference $f_1-f_2$ and the magnitude of the direct voltage $d$ depends on the magnitude of the difference $f_1-f_2$. The direct voltage or rectified signal $d$ has the value 0 when the frequency $f_1$ of the sine wave $a$ equals the frequency $f_2$ to which the discriminator 18 is tuned.

Referring again to Fig. 2, it can be seen that the terminals 74 and 75 which are the output terminals of the rectifier 22 serve also as the input terminals of the modulator 27. Therefore the modulator 27 has applied to the input terminals thereof, the rectified signal $d$ having the amplitude and polarity described hereinabove.

Also applied to the modulator 27 is an output signal from the secondary winding of a transformer U6. The output signal in the secondary winding of the transformer U6 is induced by the electrical signal applied to its primary winding from the oscillator 31. The output signal of the oscillator 31 is a constant frequency signal $e$ having a frequency $fm$ which corresponds to the operating frequency of the motor 29. This can be 60 cycles or 400 cycles per second, for example.

In the modulator 27, the rectified signal $d$ is converted by means of the alternating current signal from the oscillator 31, into a corresponding modulated alternating current voltage having the amplitude $h$ and the frequency $fm$. This modulated signal is taken from the secondary winding of the transformer U7 and applied to the input of the amplifier 28 which is the amplifier for the following motor 29.

The output of the amplifier 28 is an alternating current signal $i$ which is applied to the control winding $ms$ of the motor 29. The motor 29 also has an exciting winding $re$ which is 90° out of phase with the control winding $ms$ and which has applied thereto the output voltage $e$ occurring at the frequency $fm$ from the oscillator 31. Therefore, the motor 29 the rotor of which is mounted on the shaft 11 turns an amount depending on the amplitude of the voltage $i$ applied to the control winding $ms$. When the shaft 11 is turned by motor 29, it turns the rotor of the generator 33 which also has an exciting winding $ge$ and a control winding $gs$ which are wound 90° out of phase with each other. The exciting winding $ge$ of generator 33 has applied thereto the signal occurring at the frequency $fm$ and when the shaft 11 is rotated, a voltage is produced across the control winding $gs$ at the frequency $fm$ and having an amplitude $g$ which is proportional to the rotational speed of the shaft 11. The phase of this induced voltage also depends on the direction of rotation of the shaft 11. The sum of the voltages $g$ and $h$ are applied to the amplifier 28 which as pointed out hereinabove results in the voltage $i$ having a magnitude and phase relationship depending on the polarity of the rectified signal $d$ applied to the modulator 27. The motor 29 accordingly rotates the shaft 11 in a direction and with a velocity depending on the amplitude and phase of the voltage $i$.

When the shaft 11 is rotated, it is clear that the movable members of the variable resistors RD3 and RD4 of the discriminator 18 are also rotated to change the tuned frequency $f2$ of the discriminator 18. Accordingly, this changes the amplitude of the sine wave output $b$ as indicated in Fig. 3 so that the signals produced subsequently in the circuit are changed accordingly. This process continues until the frequency $f2$ to which the discriminator 18 is tuned corresponds precisely to the frequency $f1$ of the applied signal coming from the transmitter. At this point, as can be seen from Fig. 3, the amplitude of the output voltage will be 0 so that no voltage $i$ will be produced across the control winding $ms$ of the motor. The receiver shaft 11 will accordingly remain at the position corresponding to $f1$ until a new frequency is transmitted from the transmitter, which new frequency is determined by a change in the position of the transmitter shaft 10.

Reviewing once again, the overall operation of the circuit of Fig. 2, it can be seen that each time the angular position of the transmitter shaft 10 is changed, the frequency of the output signal from the oscillator 12 will be changed a corresponding amount. This output signal has its level regulated in the amplifier 14 and is applied to the phase shifter 17 where it is shifted 90°. The signal is also applied to the tuned discriminator 18 to produce an output voltage which is a function of the difference in frequency $f1-f2$. This output voltage which is the sine wave $b$ is rectified in the rectifier 23 as controlled by the sine wave $c$ coming from the phase shifter 17.

The rectified signal output $d$ from the rectifier 23 is modulated with the signal $e$ occurring at the frequency $fm$. The frequency $fm$ corresponds to the operating frequency for the motor 29. The modulated output signal $h$ from the modulator 27 is applied to the amplifier 21 and added to the signal $g$, if any, originating in the stabilizing generator 33. The output signal $i$ from the amplifier 28 is applied to the control winding of the motor 29 to rotate the receiver shaft 11 in a direction determined by the phase of the signal $i$ in an amount determined by the amplitude of the signal $i$. The rotation of the receiver shaft 11 changes the tuned frequency of the discriminator 18 and the feedback process continues until the tuned frequency $f2$ of the discriminator 18 equals the frequency $f1$ emitted from the oscillator 12.

In the above manner, the receiver shaft 11 is made to precisely follow the changes in the position of the shaft.

In the Wien bridge circuits, the variable resistors RD1–RD4 are all equal to each other as are the capacitors 41, 42, 71 and 72, in accordance with conventional Wien bridge oscillator practice.

The above-described system which uses a passive Wien bridge arrangement as a frequency discriminating circuit having a tuning cycle identical to the transmitter oscillator and the use of the phase-responsive rectification of the rectifier 23 provides a substantial advantage over any of the conventional systems. This is due to the fact that a direct current voltage $d$ is obtained which has a value of 0 when the tuned frequency of the discriminator 18 equals the oscillator frequency 1 and which has a polarity which corresponds to which of the frequencies is the larger. Such a control voltage is very suitable for the control of the rotational speed of the rotatable member and the direction of rotation of the adjusting motor 29 which operates at a constant frequency.

In place of the following motor 29, it is possible to use a direct current voltage motor or a hydraulic or pneumatic adjusting motor which is controlled by electrically operated valves. All of such motors will operate more reliably and accurately than synchronous motors used in conventional arrangements.

Figure 5:
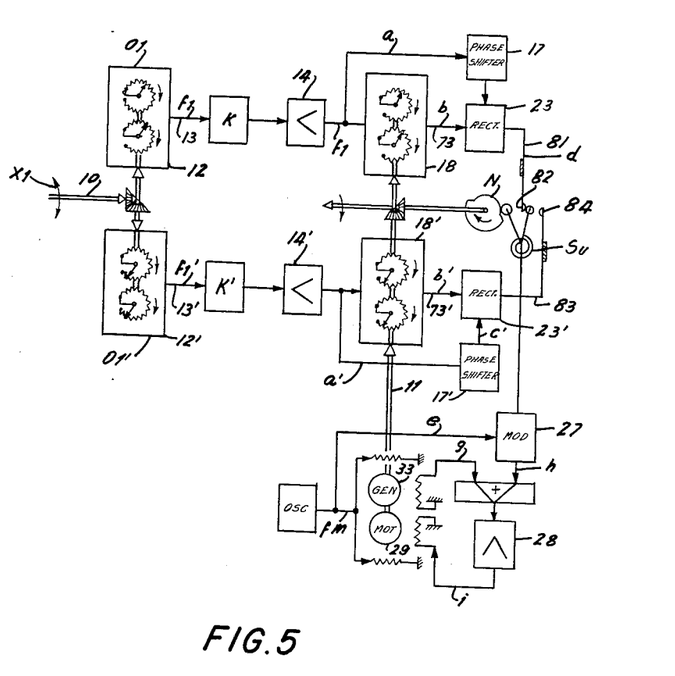
Fig. 5 is an electrical schematic diagram of a second embodiment of the present invention.

Referring now to Fig. 5, a second embodiment of the present invention is provided which permits the transmitter and receiver shafts 10 and 11 respectively to be rotated throughout a range of 360°. In this embodiment two separate Wien bridge oscillators 12 and 12' are provided. The variable resistors of the Wien bridge oscillators 12 and 12' all have movable members which are mechanically connected to the rotatable transmitter shaft 10. The movable members of the variable resistors in the oscillator 12' are arranged to be 180° out of phase with the movable members of rheostats in the oscillator 12.

Accordingly, on the output conductor 13 of the oscillator 12 is produced an electrical output signal having a frequency $f1$ and on the output conductor 13' of the oscillator 12', is produced an electrical signal having a frequency $f1'$. These are applied to the cables K and K' respectively and from there to the amplifiers 14 and 14', respectively in the receiver.

The output signal of the amplifier 14 is a sine wave $a$ as indicated in Fig. 4a and is applied to the phase shifter 17 where it is shifted by 90° as in the embodiment of Fig. 2. The sine wave $a$ is also applied to the tuned discriminator 18 which produces an output signal on the conductor 73 thereof which is a function of the frequency difference $f2-f1$. This sine wave $b$ is applied to the phase sensitive rectifier 23 to produce a rectified signal $d$ on the output of the rectifier 23. This rectified signal $d$ is applied by means of a conductor 81 to one fixed contact 82 of a switch SU.

Similarly, the output of the amplifier 14' which is an electrical signal occurring at the frequency $f1'$ is applied to the phase shifter 17' wherein it is shifted 90° to produce a sine wave $c'$ and applied to the phase sensitive rectifier 23'. The output signal from the amplifier 14' which is a sine wave $a'$ is also applied to the tuned discriminator 18' to produce on the output conductor 73' thereof a signal $b'$ which is a function of the difference in frequency $f1'-f2'$. The frequency $f2'$ is the frequency to which the discriminator 18' is tuned. It can be seen that the discriminator 18' is provided with variable resistors having movable members which are 180° out of phase with the movable members of the variable resistors of the tuned descriminator 18.

The signals $b'$ and $c'$ which are applied to the rectifier 23' produce a rectified signal $d'$ connected by means of a conductor 83 to a second fixed contact 84 of the switch S$u$.

It can be seen that the switch S$u$ is provided with a cam follower which rides along the surface of the cam N. The cam N, in turn, is mounted on the receiver shaft 11 which is coupled to both of the tuned discriminators 18 and 18', as well.

It is apparent that due to the shape of the cam track of the cam 9, the fixed contacts 82 will make electrical contact with the movable contact of the switch S$u$ for 180° of revolution of the receiver shaft 11 while the fixed contacts 84 will make electrical contact with the movable contact of the switch SU for the other 180° of the revolution of the shaft 11.

Regardless of which fixed contact 82 or 84 makes contact with the movable contact of the switch SU, the signal applied to this movable contact will be applied to the modulator 27 which will operate as before to apply the modulated signal to the motor 29 through the amplifier 28 to change the angular position of the shaft 11.

In operation, as before, the change in angular position of the rotatable shaft 10 will produce a corresponding change in the angular position of the rotatable shaft 11 in the receiver. However, in this embodiment the shaft may rotate throughout the range of 360° since either the upper or the lower transmitter-receiver combination will become effective to permit the receiver shaft to accurately follow the transmitter shaft. It is also clear that more than two transmitter-receiver channels may be provided, if desired.

It is clear that with the above-described embodiments, both of which incorporate the principles of the present invention, the distance between the transmitter and receiver is of no consequence since amplitude variations will not affect the operation of the apparatus which is frequency sensitive.

The various mechanical connections between the shafts are only shown diagrammatically. However it is clear that proper gearing can be arranged to produce the necessary rotation between mechanically connected members. As mentioned hereinabove it is also apparent that the members 10 and 11 need not be rotatable but may be movable in a rectilinear direction and the gearing arrangement between the driving motor in the receiver may be set up so that the rotation of the motor produces a rectilinear movement of the movable member in the receiver.

It is also apparent that it is not essential that the receiver and transmitter be connected by cable but that wireless arrangements may also be provided, if desired.

It will be understood that each of the elements described above, or two or more together, may also find a useful application in other types of remote control apparatus differing from the types described above.

While the invention has been illustrated and described as embodied in remote control apparatus wherein a rotatable shaft in a receiver is made to accurately follow a movement of a rotatable shaft in a transmitter, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a remote control apparatus, in combination, generating means for generating alternating current remote control signals at signal frequencies variable within a wide frequency band; a command member movable between a normal position and a plurality of displaced positions and operatively connected with said generating means for varying said signal frequencies in fixed proportion to displacements of said command member between any of said positions in such a manner that any of said signal frequencies is associated with a respective position thereof; and control signal receiving means in circuit with the output of said generating means and comprising a follower member remote from said command member and movable between a normal position and a plurality of displaced positions, a passive network means tunable by said follower member depending upon movement thereof between any of its positions to a response frequency associated with a respective position of said follower member, said passive network means being additionally connected to said output of said generating means and capable of generating an intermediate output signal being a function of any existing frequency difference between the frequency of a control signal applied to said network means and the response frequency determined at the same instant by said follower member, secondary means for deriving from said intermediate output signal a direct current voltage corresponding in magnitude and polarity to the amplitude and sign of said frequency difference, and servo-drive means operable by said direct current voltage for moving said follower member at a speed and in a direction corresponding to the magnitude and polarity of said direct current voltage, whereby any displacement of said command member by a certain amount in a particular direction produces a corresponding variation of the frequency of said remote control signals which in turn causes said network means and said secondary means to produce a direct current voltage influencing said servo-drive means to move said follower member from an initial position existing before such displacement of said command member into a position displaced from said initial position by the same amount and in the same direction as the amount and direction of said displacement of said command member, said frequency difference being reduced to zero as soon as the displaced positions of said command member and of said follower member, respectively, are identical.

2. In a remote control apparatus, in combination, generating means for generating alternating current remote control signals at signal frequencies variable within a wide frequency band; a command member rotatable between a normal position and a plurality of angularly displaced positions and operatively connected with said generating means for varying said signal frequencies in fixed proportion to angular displacements of said command member between any of said positions in such a manner that any of said signal frequencies is associated with a respective angular position thereof; and control signal receiving means in circuit with the output of said generating means and comprising a follower member remote from said command member and rotatable between a normal position and a plurality of angularly displaced positions, a passive network means tunable by said follower member depending upon movement thereof between any of its positions to a response frequency associated with a respective angular position of said follower member, said passive network means being additionally connected to said output of said generating means and capable of generating an intermediate output signal being a function of any existing frequency difference between the frequency of a control signal applied to said network means and the response frequency determined at the same instant by said follower member, secondary means for deriving from said intermediate output signal a direct current voltage corresponding in magnitude and polarity to the amplitude and sign of said frequency difference, and servo-drive means operable by said direct current voltage for turning said follower member at a speed and in a direction corresponding to the magnitude and polarity of said direct current voltage, whereby any angular displacement of said command member by a certain amount in a particular direction produces a corresponding variation of the frequency of said remote control signals which in turn causes said network means and said secondary means to produce a direct current voltage influencing said servo-drive means to turn said follower member from an initial angular position existing before such angular displacement of said command member into a position angularly displaced from said initial angular position by the same amount and in the same direction as the amount and direction of said angular displacement of said command member, said frequency difference being reduced to zero as soon as the angularly displaced positions of said command member and of said follower member, respectively, are identical.

3. In a remote control apparatus, in combination, generating means for generating alternating current remote control signals at signal frequencies variable within a wide frequency band and including a first Wien bridge circuit frequency determining portion having a first variable impedance means; a command member rotatable between a normal position and a plurality of angularly displaced positions and operatively connected with said bridge circuit portion for varying said signal frequencies in fixed proportion to angular displacements of said command member between any of said positions in such a manner that any of said signal frequencies is associated with a respective angular position thereof; and control signal receiving means in circuit with the output of said generating means and comprising a follower member remote from said command member and rotatable between a normal position and a plurality of angularly displaced positions, a passive network means including a second Wien bridge circuit frequency determining portion including at least one second variable impedance means for being tunable by said follower member depending upon movement thereof between any of its positions to a response frequency associated with a respective angular position of said follower member, said passive network means being additionally connected to said output of said generating means and capable of generating an intermediate output signal being a function of any existing frequency difference between the frequency of a control signal applied to said network means and the response frequency determined at the same instant by said follower member, secondary means for deriving from said intermediate output signals a direct current voltage corresponding in magnitude and polarity to the amplitude and sign of said frequency difference, and servo-drive means operable by said direct current voltage for turning said follower member at a speed and in a direction corresponding to the magnitude and polarity of said direct current voltage, whereby any angular displacement of said command member by a certain amount in a particular direction produces a corresponding variation of the frequency of said remote control signals which in turn causes said network means and said secondary means to produce a direct current voltage influencing said servo-drive means to turn said follower member from an initial angular position existing before such angular displacement of said command member into a position angularly displaced from said initial angular position by the same amount and in the same direction as the amount and direction of said angular displacement of said command member, said frequency difference being reduced to zero as soon as the angularly displaced positions of said command member and of said follower member, respectively, are identical.

4. In a remote control apparatus, in combination, generating means for generating alternating current remote control signals at signal frequencies variable within a wide frequency band and including a first Wien bridge circuit frequency determining portion having a first variable impedance means; a command member rotatable between a normal position and a plurality of angularly displaced positions and operatively connected with said bridge circuit portion for varying said signal frequencies in fixed proportion to angular displacements of said command member between any of said positions in such a manner that any of said signal frequencies is associated with a respective angular position thereof; and control signal receiving means in circuit with the output of said generating means and comprising a follower member remote from said command member and rotatable between a normal position and a plurality of angularly displaced positions, a passive network means including a second Wien bridge circuit frequency determining portion including at least one second variable impedance means for being tunable by said follower member depending upon movement thereof between any of its positions to a response frequency associated with a respective angular position of said follower member, said passive network means being additionally connected to said output of said generating means and capable of generating an intermediate output signal being a function of any existing frequency difference between the frequency of a control signal applied to said network means and the response frequency determined at the same instant by said follower member, secondary means including rectifier means for deriving from said intermediate output signal a direct current voltage corresponding in magnitude and polarity to the amplitude and sign of said frequency difference, and servo-drive means operable by said direct current voltage for turning said follower member at a speed and in a direction corresponding to the magnitude and polarity of said direct current voltage, whereby any angular displacement of said command member by a certain amount in a particular direction produces a corresponding variation of the frequency of said remote control signals which in turn causes said network means and said secondary means to produce a direct current voltage influencing said servo-drive means to turn said follower member from an initial angular position existing before such angular displacement of said command member into a position angularly displaced from said initial angular position by the same amount and in the same direction as the amount and direction of said angular displacement of said command member, said frequency difference being reduced to zero as soon as the angularly displaced positions of said command member and of said follower member, respectively, are identical.

5. In a remote control apparatus, in combination, generating means for generating alternating current remote control signals at signal frequencies variable within a wide frequency band and including a first Wien bridge circuit frequency determining portion having a first variable impedance means; a command member rotatable between a normal position and a plurality of angular positions and operatively connected with said bridge circuit portion for varying said signal frequencies in fixed proportion to angular displacements of said command member between any of said positions in such a manner that any of said signal frequencies is associated with a respective angular position thereof; and control signal receiving means in circuit with the output of said generating means and comprising a follower member remote from said command member and rotatable between a normal position and a plurality of angularly displaced positions, a passive network means including a second Wien bridge circuit frequency determining portion including at least one second variable impedance means for being tunable by said follower member depending upon movement thereof between any of its positions to a response frequency associated with a respective angular position of said follower member, said passive network means being additionally connected to said output of said generating means and capable of generating an intermediate output signal being a function of any existing frequency difference between the frequency of a control signal applied to said network means and the response frequency determined at the same instant by said follower member, secondary means including a rectifier means for deriving from said intermediate output signal a direct current voltage corresponding in magnitude and polarity to the amplitude and sign of said frequency difference; second generating means for producing alternating current signals having a preselected frequency; modulating means for modulating said direct current voltage with said alternating current signals to produce modulated control signals; and servo-drive means operable by said modulated control signals for turning said follower member at a speed and in a direction corresponding to the characteristics of said modulated control signals, whereby any angular displacement of said command member by a certain amount in a particular direction produces a corresponding variation of the frequency of said remote control signals which in turn causes said network means and said secondary means to produce a direct current voltage resulting in modulated control signals influencing said servo-drive means to turn said follower member from an initial angular position existing before such angular displacement of said command member into a position angularly displaced from said initial angular position by the same amount and in the same direction as the amount and direction of said angular displacement of said command member, said frequency difference being reduced to zero as soon as the angularly displaced positions of said command member and of said follower member, respectively, are identical.

6. A remote control apparatus as claimed in claim 5, comprising at least two of said generating means for generating alternating current remote control signals, the control signal frequencies of one of said generating means being out-of-phase with the control signal frequencies of the other one of said generating means by a phase angle corresponding to the number of said generating means, said command member being operatively connected with both of said generating means; said control signal receiving means comprising at least two similar passive network means respectively connected with said two generating means, and being both tunable by said follower member, said two network means being capable of generating intermediate output signals, respectively, out-of-phase with one another by the same phase angle as said control signal frequencies; and switching means controllable by said follower member for alternatively connecting said direct current voltage respectively derived from said intermediate output signals from one or the other one of said network means to said servo-drive means depending upon predetermined alternative positions of said follower member.

7. In a remote control apparatus, in combination, a first movable member; alternating current signal generating means controllable by said first movable member for causing variations of the frequency of said signals depending upon and in conformity with the speed and direction of variations of the position of said first movable member; frequency responsive means influenced by said frequency variations of said signals generated by said generating means and producing electrical output signals having characteristics corresponding to said variations of said frequency of the signals generated by said generating means; a second movable member spaced from said first movable member; and actuating means responsive to said electrical output signals of said frequency responsive means for moving said second movable member depending upon the characteristics of said electrical output signals in conformity with the speed and direction of said variations of the position of said first movable member, whereby any change of the position of said first movable member results in an identical change of the position of said second movable member.

8. In a remote control apparatus, in combination, a first movable member; alternating current signal generating means controllable by said first movable member for causing variations of the frequency of said signals depending upon and in conformity with the speed and direction of variations of the position of said first movable member; frequency responsive means influenced by said frequency variations of said signals generated by said generating means and producing electrical output signals having amplitude and phase characteristics corresponding to said variations of said frequency of the signals generated by said generating means; a second movable member spaced from said first movable member; and actuating means responsive to said electrical output signals of said frequency responsive means for moving said second movable member depending upon the amplitude and phase characteristics of said electrical output signals in conformity with the speed and direction of said variations of the position of said first movable member whereby any change of the position of said first movable member results in an identical change of the position of said second movable member.

9. In a remote control apparatus, in combination, a first rotatable member; alternating current signal generating means controllable by said first rotatable member for causing variations of the frequency of said signals depending upon and in conformity with the speed and direction of variations of the angular position of said first rotatable member, said generating means including a Wien bridge; frequency responsive means influenced by said frequency variations of said signals generated by said generating means and producing electrical output signals having characteristics corresponding to said variations of said frequency of the signals generated by said generating means; a second rotatable member spaced from said first rotatable member; and actuating means responsive to said electrical output signals of said frequency responsive means for rotating said second rotatable member depending upon the characteristics of said electrical output signals in conformity with the speed and direction of said variations of the position of said first rotatable member whereby any change of the angular position of said first rotatable member results in an identical change of the angular position of said second rotatable member.

10. In a remote control apparatus, in combination, a first movable member; alternating current signal generating means including a bridge circuit frequency determining portion having a variable impedance means controllable by said first movable member for causing variations of the frequency of said signals depending upon and in conformity with the speed and direction of variations of the position of said first movable member; frequency responsive means influenced by said frequency variations of said signals generated by said generating means and producing electrical output signals having characteristics corresponding to variations of said frequency of the signals generated by said generating means; a second movable member spaced from said first movable member; and actuating means responsive to said electrical output signals of said frequency responsive means for moving said second movable member depending upon the characteristics of said electrical output signals in conformity with the speed and direction of said variations of the position of said first movable member, whereby any change of the position of said first movable member results in an identical change of the position of said second movable member.

11. In a remote control apparatus, in combination, a first movable member; alternating current signal generating means controllable by said first movable member for causing variations of the frequency of said signals depending upon and in conformity with the speed and direction of variations of the position of said first movable member; frequency responsive means influenced by said frequency variations of said signals generated by said generating means and producing electrical output signals having characteristics corresponding to said variations of said frequency of the signals generated by said generating means, said frequency responsive means having a Wien bridge frequency determining circuit including at least one variable impedance means; a second movable member spaced from said first movable member and connected to said variable impedance means to vary the frequency determining circuit thereof when the position of said second movable member is changed; and actuating means responsive to said electrical output signals of said frequency responsive means for moving said second movable member depending upon the characteristics of said electrical output signals in conformity with the speed and direction of said variations of the position of said first movable member, whereby any change of the position of said first movable member results in an identical change of the position of said second movable member.

12. In a remote control apparatus, in combination, a first movable member; alternating current signal generating means including a first Wien bridge circuit frequency determining portion having a variable impedance means controllable by said first movable member for causing variations of the frequency of said signals depending upon and in conformity with the speed and direction of variations of the position of said first movable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency responsive means having a second Wien bridge frequency determining circuit having substantially the same parameters as said first Wien bridge circuit and including at least one variable second impedance means connected with said discriminator means for supplying the latter with said second input frequency; a second movable member spaced from said first movable member and operatively connected to said variable second impedance means to vary said second input frequency by controlling said second input frequency determining circuit thereof when the position of said second movable member is changed; and actuating means responsive to said electrical output signals of said frequency responsive means for moving said second movable member depending upon the characteristics of said electrical output signals when the latter represent a difference in the speeds and directions of the variations of position of said first and second movable members, whereby any change in the position of said first movable member produces a corresponding variation in the frequency of the signals generated by said generating means which in turn causes corresponding changes in the characteristics of said electrical output signals produced by said frequency responsive means whenever said second movable member does not change its position at the same speed and in the same direction as said first member so that the position of said second movable member is changed identically with the change of the position of said first movable member.

13. In a remote control apparatus, in combination, a first movable member; alternating current signal generating means including a first bridge circuit frequency determining portion having at least one variable impedance means controllable by said first movable member for causing variations of the frequency of said signals depending upon and in conformity with the speed and direction of variations of the position of said first movable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency discriminator means including a second bridge circuit frequency determining portion for supplying with said second input frequency; rectifier means responsive to said electrical output signals for rectifying the same to produce rectified signals having an amplitude proportional to an existing difference between said first and second input frequencies; a second movable member spaced from said first movable member and operatively connected to said second bridge circuit for controlling said second input frequency when the position of said second movable member is changed; and actuating means responsive to said rectified signals for moving said second movable member depending upon the amplitude of said rectified signals, whereby any change in the position of said first movable member produces a corresponding variation in the frequency of the signals generated by said generating means which in turn causes corresponding changes in the characteristics of said electrical output signals produced by said frequency responsive means whenever said second movable member does not change its position at the same speed and in the same direction as said first member, so that the position of said second movable member is changed identically with the change of the position of said first movable member.

14. In a remote control apparatus, in combination, a first movable member; alternating current signal generating means controllable by said first movable member for causing variations of the frequency of said signals depending upon and in conformity with the speed and direction of variations of the position of said first movable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency discriminator means including frequency determining means for supplying with said second input frequency; rectifier means responsive to said electrical output signals for rectifying the same to produce rectified signals having an amplitude proportional to an existing difference between said first and second frequencies; a second movable member spaced from said first movable member and operatively connected to said frequency determining means for controlling said second input frequency when the position of said second movable member is changed; and actuating means responsive to said rectified signals for moving said second movable member depending upon the amplitude of said rectified signals, whereby any change in the position of said first movable member produces a corresponding variation in the frequency of the signals generated by said generating means which in turn causes corresponding changes in the characteristics of said electrical output signals produced by said frequency responsive means whenever said second movable member does not change its position at the same speed and in the same direction as said first member, so that the position of said second movable member is changed identically with the change of the position of said first movable member.

15. In a remote control apparatus, in combination, a first movable member; alternating current signal generating means including a first bridge circuit frequency determining portion having at least one variable impedance means controllable by said first movable member for causing variations of the frequency of said signals depending upon and in conformity with the speed and direction of variations of the position of said first movable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency responsive means including a second bridge circuit frequency determining portion connected with said discriminator means for supplying the latter with said second input frequency; rectifier means responsive to said electrical output signals for rectifying the same to produce rectified signals having an amplitude proportional to an existing difference between said first and second input frequencies and having a polarity corresponding to the direction of said variation of frequency; a second movable member spaced from said first movable member and operatively connected to said frequency determining means for controlling said second input frequency when the position of said second movable member is changed; and actuating means responsive to said rectified signals for moving said second movable member depending upon the amplitude and polarity of said rectified signals, whereby any change in the position of said first movable member produces a corresponding variation in the frequency of the signals generated by said generating means which in turn causes corresponding changes in the characteristics of said electrical output signals produced by said frequency responsive means whenever said second movable member does not change its position at the same speed and in the same direction as said first member, so that the position of said second movable member is changed identically with the change of the position of said first movable member.

16. In a remote control apparatus, in combination, a first rotatable member; alternating current signal generating means controllable by said first rotatable member for causing variations of the frequency of said signals depending upon and in conformity with the speed and direction of variations of the angular position of said first rotatable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency responsive means including frequency determining means connected with said discriminator means for supplying the latter with said second input frequency; rectifier means responsive to said electrical output signals for producing rectified signals having characteristics corresponding to an existing difference between said first and second input frequencies; means for producing alternating current signals having a preselected frequency; modulating means for modulating said rectified signals with said alternating current signals to produce modulated control signals; a second rotatable member spaced from said first rotatable member and operatively connected to said frequency determining means for controlling said second input frequency when the position of said second movable member is changed; and actuating means responsive to said modulated control signals for rotating said second rotatable member an amount depending upon the characteristics of said modulated control signals whereby any change in the position of said first rotatable member produces a corresponding variation in the frequency of the signals generated by said generating means which in turn causes corresponding changes in the characteristics of said modulated control signals whenever said second rotatable member does not change its position at the same speed and in the same direction as said first member so that the angular position of said second rotatable member is changed identically with the change of the position of said first rotatable member.

17. In a remote control apparatus, in combination, a first rotatable member; alternating current signal generating means including a first Wien bridge circuit having at least one variable impedance means controllable by said first rotatable member for causing variations of the frequency of said signals depending upon and in conformity with the speed and direction of variations of the angular position of said first rotatable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency discriminator means including a second Wien bridge circuit tunable to a plurality of frequencies for supplying with said second input frequency; rectifier means responsive to said electrical output signals for producing rectified signals having characteristics corresponding to an existing difference between said first and second input frequencies; means for producing alternating current signals having a preselected frequency; modulating means for modulating said rectified signals with said alternating current signals to produce modulated control signals; a second rotatable member spaced from said first rotatable member and connected to said second bridge circuit for varying the frequency to which the same is tuned in a manner corresponding to variations of the angular position of said second rotatable member; and actuating means responsive to said modulated control signals for rotating said second rotatable member an amount depending upon the characteristics of said modulated control signals whereby any change in the position of said first rotatable member produces a corresponding variation in the frequency of the signals generated by said generating means which in turn causes corresponding changes in the characteristics of said modulated control signals whenever said second rotatable member does not change its position at the same speed and in the same direction as said first member so that the angular position of said second rotatable member is changed identically with the change of the position of said first rotatable member.

18. In a remote control apparatus, in combination, a first rotatable member; alternating current signal generating means controllable by said first rotatable member for causing variations of the frequency of said signals depending upon and in conformity with the speed and direction of variations of the angular position of said first rotatable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency discriminator means including frequency determining means for supplying with said second input frequency; rectifier means responsive to said electrical output signals for producing rectified signals having amplitudes respectively proportional to an existing difference between said first and second input frequency and having polarities corresponding to the direction of said frequency variations; means for producing alternating current signals having a preselected frequency; modulating means for modulating said rectified signals with said alternating current signals to produce modulated control signals; a second rotatable member spaced from said first rotatable member and operatively connected to said frequency determining means for controlling said second input frequency when the position of said second rotatable member is changed; and actuating means responsive to said modulated control signal for rotating said second rotatable member an amount depending upon the characteristics of said modulated control signals whereby any change in the position of said first rotatable member produces a corresponding variation in the frequency of the signals generated by said generating means which in turn causes corresponding changes in the characteristics of said modulated control signals whenever said second rotatable member does not change its position at the same speed and in the same direction as said first member so that the angular position of said second rotatable member is changed identically with the change of the position of said first rotatable member.

19. In a remote control apparatus, in combination, a first rotatable member; alternating current signal generating means including a first Wien bridge circuit having at least one variable impedance means controllable by said first rotatable member for causing variations of the frequency of said signals depending upon and in conformity with the speed and direction of variations of the angular position of said first rotatable member; frequency responsive means comprising frequency discriminator means capable of producing electrical output signals having characteristics representing a difference between a first and a second input frequency, said discriminator means being connected in circuit with said generating means for being supplied with said signals generated by said generating means and constituting said first input frequency, said frequency discriminator means including a second bridge circuit tunable to a plurality of frequencies for supplying with said second input frequency; rectifier means responsive to said electrical output signals for producing rectified signals having amplitudes respectively proportional to an existing difference between said first and second input frequencies and having polarities corresponding to the direction of said frequency variations; means for producing alternating current signals having a preselected frequency; modulating means for modulating said rectified signals with said alternating current signals to produce modulated control signals; a second rotatable member spaced from said first rotatable member and connected to said second bridge circuit for varying the frequency to which the same is tuned in a manner corresponding to variations of the angular position of said second rotatable member; and actuating means responsive to said modulated control signal for rotating said second rotatable member an amount depending upon the characteristics of said modulated control signals whereby any change in the position of said first rotatable member produces a corresponding variation in the frequency of the signals generated by said generating means which in turn causes corresponding changes in the characteristics of said modulated control signals whenever said second rotatable member does not change its position at the same speed and in the same direction as said first member so that the angular position of said second rotatable member is changed identically with the change of the position of said first rotatable member.

20. In a remote control arrangement, in combination, a first movable member; alternating current signal generating means controllable by said first movable member for causing variations of the frequency of said signals depending upon and in conformity with the speed and direction of variations of the position of said first movable member; frequency responsive means influenced by said frequency variations of said signals generated by said generating means and producing electrical output signals having characteristics corresponding to said variations of said frequency of the signals generated by said generating means, said frequency responsive means including at least two similar frequency generating circuits for generating said electrical output signals; a second movable member spaced from said first movable member; actuating means responsive to said electrical output signals of said frequency responsive means for moving said second movable member depending upon the characteristics of said electrical output signal in conformity with the speed and direction of said variations of the position of said first movable member; and switching means controllable by said second movable member for connecting alternatively said electrical output signals from one or the other one of said frequency generating circuits to said actuating means depending upon predetermined alternative positions of said second movable member, whereby any change in the position of said first movable member produces a corresponding variation in the frequency of the signals generated by said generating means which in turn causes corresponding changes in the characteristics of said electrical output signals produced by said frequency responsive means to change the position of said second movable member identically with the change of the position of said first movable member.

References Cited in the file of this patent

UNITED STATES PATENTS

| | | |
|---|---|---|
| 2,592,770 | Waldie et al. | Apr. 15, 1952 |
| 2,602,139 | Holder et al. | July 1, 1952 |
| 2,681,431 | Wannamaker | June 15, 1954 |
| 2,830,241 | Turck | July 20, 1955 |
| 2,760,132 | Pawley | Aug. 21, 1956 |